No. 752,923. PATENTED FEB. 23, 1904.
C. ADAMS-RANDALL.
ELECTRIC TELEGRAPH SYSTEM.
APPLICATION FILED SEPT. 6, 1902.
NO MODEL. 2 SHEETS—SHEET 1.
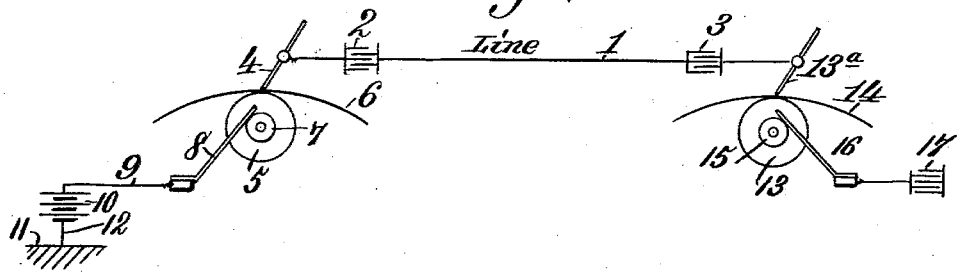
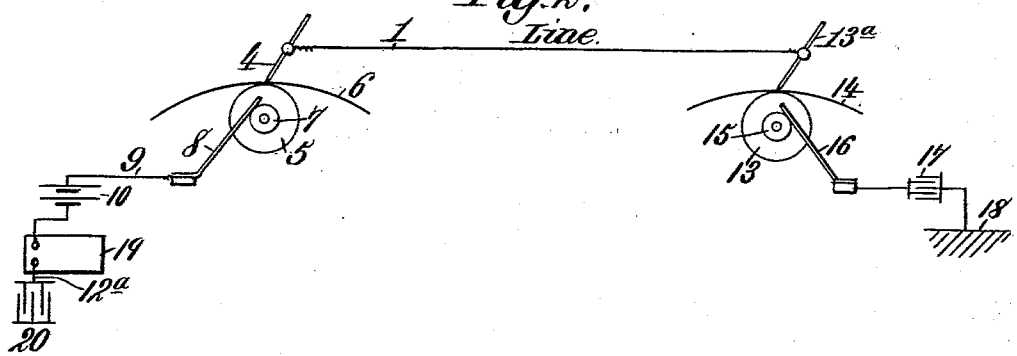
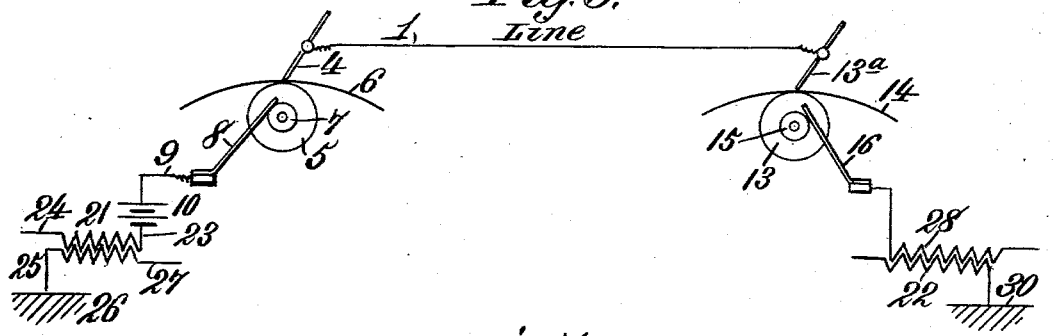
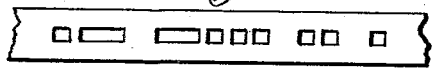
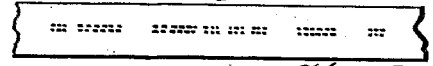

No. 752,923. PATENTED FEB. 23, 1904.
C. ADAMS-RANDALL.
ELECTRIC TELEGRAPH SYSTEM.
APPLICATION FILED SEPT. 6, 1902.
NO MODEL. 2 SHEETS—SHEET 2.
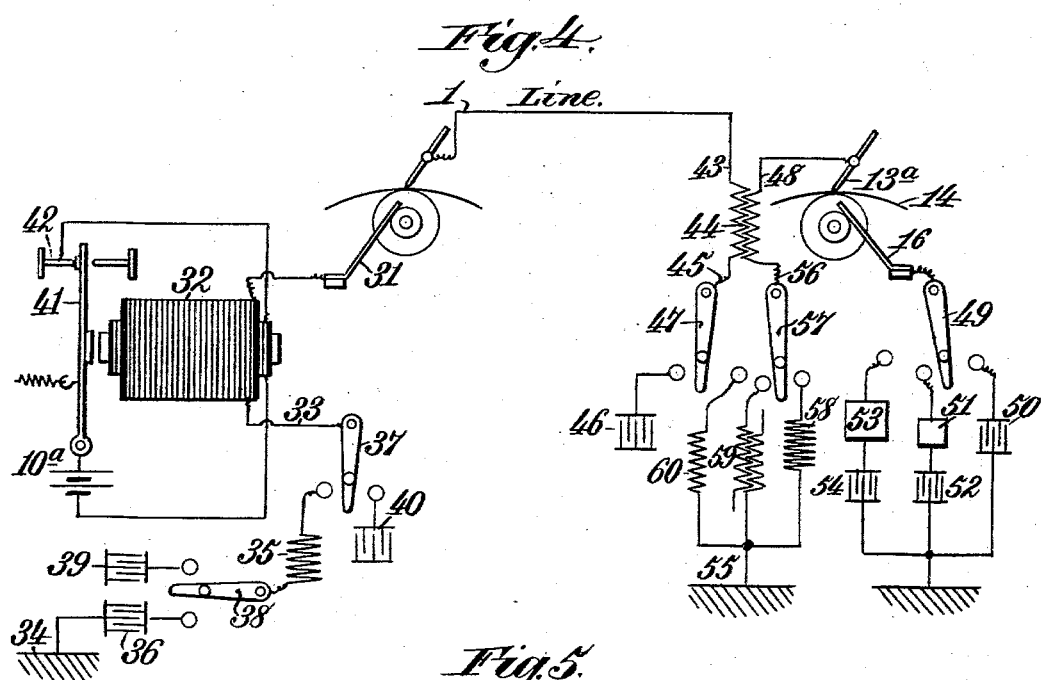
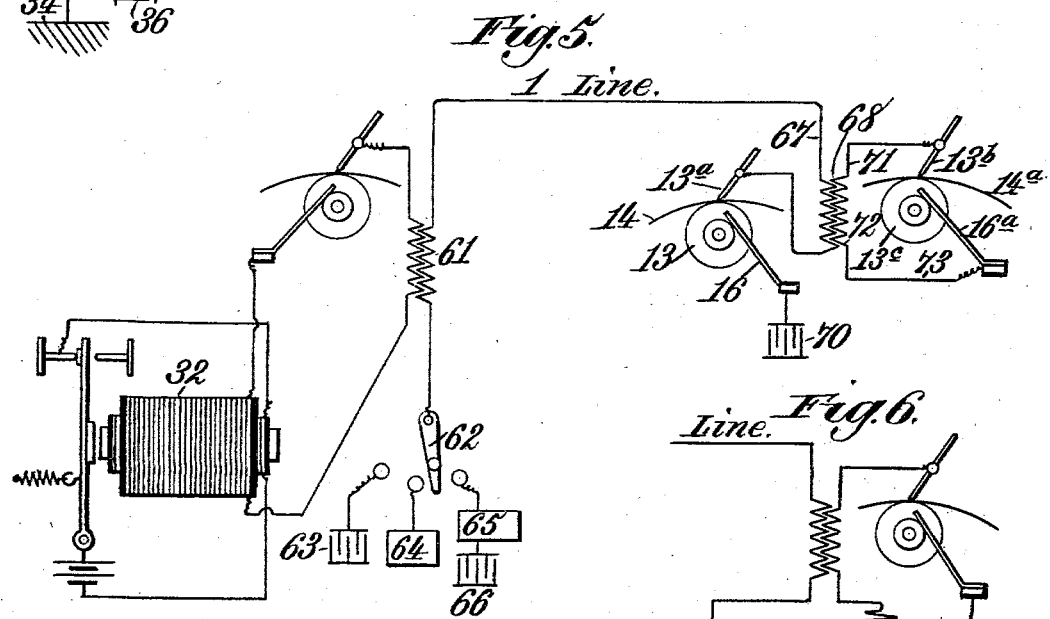
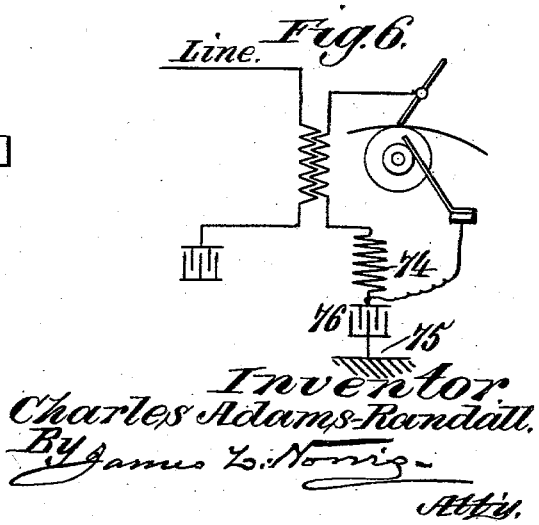
Witnesses.
Robert Everett.
Inventor
Charles Adams-Randall.
By James L. Norris
Atty.

No. 752,923.

Patented February 23, 1904.

UNITED STATES PATENT OFFICE.

CHARLES ADAMS-RANDALL, OF NEW YORK, N. Y.

ELECTRIC-TELEGRAPH SYSTEM.

SPECIFICATION forming part of Letters Patent No. 752,923, dated February 23, 1904.

Application filed September 6, 1902. Serial No. 122,418. (No model.)

*To all whom it may concern:*

Be it known that I, CHARLES ADAMS-RANDALL, a citizen of the United States, residing at New York, in the county of New York and State of New York, have invented new and useful Improvements in Electric-Telegraph Systems, of which the following is a specification.

This invention relates to electric telegraphy, and particularly to the electrical transmission of messages by means of a novel and especially-designed arrangement of the electric circuit and circuit connections and by the employment of special transmission currents or impulses and apparatus used in connection therewith, the said invention being particularly applicable to the electrical transmission of messages over submarine and underground cables and similar conductors or circuits; and it has for its object to greatly increase the speed of transmission and transmit messages over circuits of greater length than heretofore and to overcome or counteract the detrimental effects of retardation, induction, and earth currents on the line conductor.

To these ends my invention consists in the features and in the novel arrangement of the main-line circuit and its terminal connections and in combination therewith the apparatus hereinafter described, and particularly pointed out in the claims following the description, reference being had to the accompanying drawings, forming a part of this specification, wherein—

Figure 1 is a diagrammatic view illustrating my invention in its simplest form; and Figs. 2 to 6, inclusive, are views similar to Fig. 1, illustrating modified arrangements. Figs. 7 and 8 are plan views of the transmitting and recording ribbons or strips, respectively.

In telegraphy it has heretofore been the theory that the "static capacity," so called, of cables, both submarine and underground, affects the rapid transmission of electric impulses, limiting the distance of direct-circuit transmission and the speed or rapidity thereof, and by means of my invention I seek to overcome these objections and defects and to obtain a largely-increased speed of transmission and to effect such transmissions over circuits of increased length. In carrying into effect these objects an important feature of my invention consists in leaving the main-line wire, cable, or conductor open or ungrounded at either the transmitting or receiving end of the circuit or at both such ends—that is to say, without actual mechanical connection with the ground direct, as is customary in the use of grounded circuits. In carrying out this part of my invention a return-wire or a mechanical connection to ground are unnecessary if the circuit has or is given the proper resistance and capacity. Under such general arrangement I am enabled to overcome and utilize the static capacity, charge, or condition of a cable or other telegraphic circuit, which has heretofore been considered and found detrimental to rapid telegraphy as practiced with grounded circuits. Apparently such phenomena may be explained as follows: A line or cable arranged and employed in the manner set forth herein acts in manner similar to a highly-charged condenser, the discharge from such a circuit being intermittent, convective, and of great rapidity as contradistinguished from gradual discharges. Whatever may be the actual electrical action of a circuit so arranged or the correct scientific explanation of the various phenomena observed in employing such novel arrangements and conditions of the circuits and apparatus forming the subject-matter of this invention, the receiving apparatus will faithfully and accurately record the intermittent currents, impulses, or vibrations set up in the circuit at the transmitting end thereof and with an intensity or force dependent upon the current energy employed at the transmitter.

In order that my invention may be the more clearly understood, a brief statement of a familiar arrangement of a telegraph system that has heretofore been used and which is well known to those skilled in the art will here preface the detailed description of my invention. In such known system a line-wire is used in connection with a battery and with transmitting and receiving instruments, the circuit being completed by a direct connection to ground at both ends of the line or to ground through a condenser at one end of the line. In one form of such a system the transmitter comprises a rotating metallic drum, on the periphery of which is arranged to rest a circuit-closing brush or contact-finger connected to one terminal of the line, a spring-contact being in constant engagement with said drum, and from said spring-contact leads a wire to one pole of a battery, and from the other pole of the battery a wire leads to ground. The receiver comprises a rotating metallic drum and an electrode or contact-finger, herein termed for the sake of description a "marker," which is arranged to rest at its end on the drum and is connected to the other terminal of the line. A spring-contact is in constant engagement with the receiving-drum and connects the latter to a switch or contact-lever, which in turn may be moved to connect the drum directly with the ground or with a condenser connected with the ground. A perforated paper ribbon is arranged between the transmitting-drum and its circuit-closing brush or contact-finger, and a chemically-prepared strip of paper, which is visually affected by the passage therethrough of an electric current, is arranged between the receiving-drum and its marker, suitable means being provided for feeding said paper strips between the drums and the brush or contact-finger and the marker. In such a telegraph system the battery-current is transmitted to line whenever the contact brush or finger makes contact with the transmitter-drum through the perforations in the paper ribbon, the current passing over the line to the receiver, where the marker records a dot or dash or other symbol on the chemically-prepared paper and thence passes to ground in a well-known manner. Such type of transmitter and receiver is illustrated in the several figures of drawings showing different forms of my invention and need not, therefore, be further described in detail.

My invention in its simplest form is shown in Fig. 1 of the drawings, wherein the numeral 1 indicates the line, in which are included two condensers 2 and 3, one at each end of the line, of ordinary construction. One end of the line is connected to a contact brush or finger 4, which rests at one end on the periphery of the transmitter-drum 5 or on the perforated ribbon 6, which is adapted to be fed between the drum and the contact-brush. Resting on the hub 7 of the drum 5 is a spring-contact 8, which is connected by wire 9 to a battery 10, and the latter is grounded at 11 by wire 12. The other end of the line is connected to the marker 13$^a$, which rests at one end on the receiver-drum 13 or on the chemically-prepared strip of record-paper 14. Resting on the hub 15 of the drum 13 is one end of a spring-contact 16, the other end of which is connected to a condenser 17, which discharges into the air or to the ground through the air or space, or instead of a condenser being connected to the spring-contact a wire may lead from the latter to an artificial line or may discharge into the atmosphere. The operation of this arrangement of the invention will be readily understood by those skilled in the art. The message to be transmitted is transferred to the paper ribbon 6 by punching the proper dots or dashes or other symbols in the ribbon, and the latter is fed between the drum 5 and brush 4. As the paper ribbon passes under the brush the latter will successively project through the perforations and make electrical contact with the drum 5, the duration of such electrical contact corresponding to the length of the perforations in the paper ribbon. Each time the brush projects through a perforation in the ribbon 6 and contacts with the drum 5 the circuit will be closed between the battery and the receiver and will cause the marker 14 to record a corresponding dot or dash on the chemically-prepared paper strip 14. The current is finally discharged into the atmosphere or into an artificial line, or, as shown in Fig. 1, into a condenser 17 and thence into the air or to ground through the air or space.

In the arrangement shown in Fig. 2 of the drawings the circuit is grounded at the receiver end of the line, as at 18, with or without a condenser 17. At the transmitter end of the line an artificial line or cable of high resistance, approximately that of the line or cable 1 or an impedance 19, is interposed between the battery 10 or other source of electric energy, and the terminal of the wire 12$^a$ is preferably connected to one side of a suitable condenser 20, the opposite side of the condenser being open or unconnected with the ground.

The results obtained by means of the arrangements shown in Figs. 1 and 2 are very similar and in either case far superior to the results obtained by the well-known arrangement before explained.

In the arrangement shown in Fig. 3 of the drawings I interpose, preferably, at both ends of the circuit a split or compound wound coil 21 22, such coil having two independently-wound helices, which may be conveniently formed by winding the two helices simultaneously about the same core, substantially the same number of ampere-turns and same resistance being given to each coil. One terminal, 23, of one of the helices of the coil 21 is connected to the battery 10 or other source of electric energy, the opposite terminal, 24, being left open, and one terminal, 25, of the other helix of the coil 21 is connected to ground, as at 26, the opposite terminal, 27, being left open. At the receiver one end, 28, of one of the helices of the coil 22 is connected to the spring-contact 16, the opposite end being left open, and one end, 29, of the other helix is connected to ground, as at 30, the other end of said helix being left open.

In the arrangement shown in Fig. 4 of the drawings the transmitter is connected to one terminal, 31, of the secondary of a Ruhmkorff coil 32, the other terminal, 33, being connected to ground, as at 34, preferably through an impedance or an artificial line 35 and, if required, a condenser 36 through the medium of switches 37 38. Through the switch 38 the impedance may be connected to an ungrounded condenser 39, or the line may also be connected to a mechanically-ungrounded condenser 40 by the switch 37. The battery $10^a$ is in circuit with the primary of the Ruhmkorff coil 32 through a vibratory circuit-breaker 41 42, actuated electromagnetically and mechanically as in the manner well known, and it will be manifest to those skilled in the art that other forms of rapid interrupters can be employed for the purpose. At the receiving end the line-wire, cable, or conductor is connected to one end, 43, of one of the helices of a split or compound coil 44, the opposite end, 45, being left open or connected to a condenser 46 by a switch 47. One end 48 of the other helix of the compound coil 44 is connected to the marker $13^a$ of the receiver, and the drum 13 is connected by the spring-contact 16 to a switch 49, by means of which connection may be made through a condenser 50 or through a rheostat 51 and condenser 52 or through an impedance or artificial line 53 and condenser 54 to ground 55. The other end 56 of the said helix is connected to a switch 57, through which it may be connected to an impedance 58, split coil 59, or an adjustable resistance 60 to ground, as at 55, according to the conditions of the circuit, which conditions and their requirements can only be determined in practical use. By means of the arrangement above described the line-circuit is not mechanically or directly grounded, but open at one end, and under conditions of high capacity may be both ends, due consideration being given to the impedance or artificial line 35 and the condenser 39 at the transmitter and the windings of the compound coil 44 and the local connections thereto. It will be observed that in this arrangement the battery-currents do not pass over the line, but in lieu thereof induced interrupted alternating currents of high tension and great rapidity are employed, and these currents are selected and transmitted to the line as in the manner hereinafter explained. It will also be obvious that the receiving instrument is only connected to the line inductively, by which great freedom is obtained from the detrimental effects on the line of induction, earth-currents, and like disturbing causes.

In the arrangement shown in Fig. 5 of the drawings the secondary of the Ruhmkorff coil 32 is included in a local circuit with the transmitter and one of the helices of a compound coil 61, such as before described. One end of the other helix of the coil 61 is connected to the line-wire 1 and at its other end to a switch 62 and thence to a condenser 63 or to an impedance 64 or to an artificial line, resistance, or impedance 65 and a condenser 66, and thence through either 63 64 66 to ground, as the best results in practice under particular conditions may require. The other end of the line-wire or cable conductor 1 is connected to one terminal 67 of one of the helices of a compound coil 68, and the other terminal 69 is connected to the marker $13^a$ of the receiver-drum 13, and the latter is connected by the spring-contact 16 to a condenser 70. The terminal 71 of the other helix of the compound coil 68 is connected to a marker $13^b$, the circuit of the latter being through the chemically-prepared auxiliary recording paper strip $14^a$, to auxiliary drum $13^c$ and contact-spring $16^a$, back to the other terminal 72 of the said helix by wire 73, the auxiliary receiver being thus in a local circuit. It will be understood that either the recorder in the line or in local circuit, or both, may be used as practice may determine. A modification of this arrangement is shown in Fig. 6, in which the local receiver-circuit includes also an impedance 74, which tends to direct the currents through the receiver, especially with a ground connection 75, which may, if required, also include a condenser 76, such ground connection being necessary in some cases and serving to more completely discharge the circuit and indirectly the line-circuit. The impedance-coil 74 (see Fig. 6) prevents the entire discharge to earth of the coil 68, compelling the greater quantity of the current to pass by way of the recording-pen, and at the same time can be used to regulate the amount of current passing by way of the pen to obtain sharpness in recording, the discharge of the impedance-coil also assisting in this to a greater extent than simple resistance would. In such an arrangement the rapid interrupted alternating induced currents pass over from the source of electrical supply to one of the helices of the coil 61 in circuit with the generator, thereby inducing in the other helix of said coil corresponding currents or impulses which are transmitted over the line 1 and coil 68 to the receiver 13 and to the condenser 70, which discharges into the atmosphere, causing a record to be made upon the chemical paper strip 14 of the electric currents, impulses, vibrations, or changes transmitted to or produced at either or all of the receivers shown in Figs. 5 and 6 corresponding to the electric effects or changes obtained or effected at the transmitter. It will be understood that in the arrangement shown in Fig. 5 condensers may be inserted in the line, and especially in a cable-circuit, in the manner shown in Fig. 1.

The arrangement of circuits shown in Figs. 5 and 6 when the proper auxiliary devices are used to obtain the best possible electric conditions of an ungrounded circuit gives far better results than any other arrangement of circuits now known to me and enables the use of much longer circuits and the transmission of messages at far greater speed, and the so-called "static" or "electric" condition of long lines, particularly of cable-circuits, apparently assists in transmission rather than retarding or impeding the same, as is found to be the case with grounded circuits, or else prevents, overcomes, or neutralizes retardation.

In practicing my invention these high-tension currents preferably used are selected and transmitted to line in a predetermined manner through the medium of any suitable telegraph-transmitter. With a machine-transmitter similar to that shown in the drawings I preferably used transmitting-paper punched with one row of perforations composed of long and short apertures corresponding to the dot and dash of the Morse alphabet, as shown in Fig. 7. In practice as the perforated paper passes through the transmitter contact is made through the perforations for a sufficient length of time to permit a very large number of the rapid electric impulses to pass from the generator during the time of contact through each perforation, which impulses are recorded, preferably in two parallel rows, in individual groups to form the dots and dashes or other symbols, as shown in Fig. 8. Owing to the extremely large number of impulses transmitted under this method in the time usually required to transmit a single impulse from a battery, instead of groups of dots the record has the appearance of a continuous mark for each dot or dash, and the combined effect of these numerous impulses upon the most sensitive electromagnetic recording apparatus corresponds to that of a single-current transmission, with the advantage that there is no apparent retardation or detrimental static effects in the circuit, the interrupted high-tension currents acting evidently to keep the circuit discharged and maintained in normal condition for the reception and conduction of the currents transmitted.

Although I have described a form of transmitter applicable to machine telegraphy, it is obvious that a Morse key or other manual, mechanical, or electromechanical telegraph-transmitter can be used and likewise that a mechanical or electromechanical receiving or recording apparatus can be used in lieu of the chemical paper mentioned without departing from the spirit of my invention.

Having described my invention, what I claim is—

1. In a system of telegraphy the combination of a single-circuit line, suitable transmitting and receiving apparatus and a source of electric energy contained therein, said circuit being open or mechanically ungrounded at one end and grounded at the other end, substantially as and for the purpose set forth.

2. In a system of telegraphy the combination with a main-line circuit of transmitting apparatus, a source of electric energy and a double-wound coil contained in the line-circuit, said circuit being inductively grounded at the receiving end through the medium of said coil, one side of the helix being connected in the line and mechanically ungrounded, the other side of helix being connected up in a local grounded circuit, which includes suitable receiving apparatus, substantially as described.

3. In a system of telegraphy, a main-line circuit mechanically grounded in combination with an alternating-current generator, a transmitting apparatus and a double-wound coil contained in said circuit, one side or half of said coil being connected in the line-circuit and mechanically ungrounded, the other side or half of said coil being connected up in a local grounded circuit, which includes the receiving apparatus.

4. In a system of telegraphy, a line-circuit mechanically ungrounded at the transmitting end and open at the receiving end in combination with a suitable current-generator and transmitting and receiving apparatus, double-wound coils, one half or side of such coils being connected up in the line, the other half or side being connected up in local ungrounded circuits at each end of the line in which local circuits are included the transmitting and receiving apparatus.

5. In a system of telegraphy, a single line mechanically ungrounded at one or both of its terminals, in combination with means for producing at the transmitter induced alternating currents of uniform power and duration, and means for automatically selecting, transmitting and receiving such currents, substantially as and for the purpose specified.

6. In a system of telegraphy, a single line inductively grounded at its terminals, in combination with means for automatically selecting, transmitting and receiving thereover rapidly-alternating currents of uniform duration, substantially as and for the purpose specified.

7. In a system of telegraphy, a circuit mechanically ungrounded and having condensers, one or more included therein, in combination with suitable transmitting and receiving apparatus for automatically selecting, transmitting and receiving electric impulses of uniform power and duration over and upon said line, substantially as and for the purpose specified.

8. In a system of telegraphy, the combination with a mechanically-ungrounded line-circuit, of a generator of electric energy, apparatus for automatically selecting and transmitting currents or impulses from such generator, and suitable receiving apparatus, substantially as described.

9. In a system of telegraphy, the combination with a mechanically-ungrounded line-circuit, of a generator of electric energy, apparatus such as perforated paper for automatically selecting and transmitting currents or impulses from such generator, and suitable receiving apparatus, the generator and transmitter being in a local ungrounded circuit inductively connected to the main-line circuit, substantially as described.

10. In a system of telegraphy, the combination with a mechanically-ungrounded line-circuit, of a generator of electric energy, apparatus such as perforated paper for automatically selecting and transmitting currents or impulses from such generator, and suitable receiving apparatus, the generator and transmitter being in the line-circuit or in a local circuit, substantially as described.

In testimony whereof I have hereunto set my hand in presence of two subscribing witnesses.

CHARLES ADAMS-RANDALL.

Witnesses:
    HENRY MEISOLL,
    C. L. FRITZ.